US010187936B1

(12) United States Patent
Letourneur (10) Patent No.: US 10,187,936 B1
(45) Date of Patent: *Jan. 22, 2019

(54) NON-LINEAR LIGHTING SYSTEM BRIGHTNESS CONTROL FOR A USER DEVICE

(71) Applicant: Amazon Technologies, Inc., Reno, NV (US)

(72) Inventor: Hervé Jacques Clément Letourneur, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/098,978

(22) Filed: Apr. 14, 2016

Related U.S. Application Data

(62) Division of application No. 13/735,632, filed on Jan. 7, 2013, now Pat. No. 9,345,103.

(51) Int. Cl.
*H05B 37/02* (2006.01)
*H05B 33/08* (2006.01)
*G09G 3/34* (2006.01)

(52) U.S. Cl.
CPC ....... *H05B 33/0815* (2013.01); *G09G 3/3406* (2013.01); *H05B 33/0854* (2013.01); *H05B 37/0218* (2013.01); *G09G 2320/0626* (2013.01); *G09G 2360/144* (2013.01)

(58) Field of Classification Search
CPC ............ H05B 33/0815; H05B 33/0854; H05B 37/0218; G09G 3/3406; G09G 2320/0626; G09G 2360/144

USPC ........................................................ 315/152
See application file for complete search history.

(56) References Cited

U.S. PATENT DOCUMENTS

| | | | | |
|---|---|---|---|---|
| 8,890,435 B2 * | 11/2014 | Bora | ................. | H05B 33/0863 315/292 |
| 9,622,326 B1 * | 4/2017 | Devyver | ............ | H05B 37/0227 |
| 2007/0279440 A1 * | 12/2007 | Negley | .............. | H05B 33/0827 345/691 |
| 2009/0113295 A1 | 4/2009 | Halpern | | |
| 2009/0293019 A1 | 11/2009 | Raffel | | |
| 2012/0062126 A1 * | 3/2012 | Wu | ..................... | H05B 37/0218 315/151 |
| 2013/0061180 A1 | 3/2013 | Dongen | | |
| 2013/0328841 A1 * | 12/2013 | Syed | ..................... | G01J 1/0271 345/207 |
| 2015/0281252 A1 * | 10/2015 | Melcher | ................ | G06T 11/206 726/4 |

* cited by examiner

*Primary Examiner* — Don Le
(74) *Attorney, Agent, or Firm* — Eversheds Sutherland (US) LLP (57) ABSTRACT

This disclosure relates to systems and methods adjusting lighting system brightness in a non-linear manner. The brightness control may be based on a non-linear function that increases brightness in smaller increments at lower brightness levels than at higher brightness levels. In another embodiment, the lighting system brightness may be ramped down over a period of time to account when the user device is exposed to low light conditions. The ramp down may be based, at least in part, on changes in visual acuity in low light conditions over time.

20 Claims, 8 Drawing Sheets

NON-LINEAR LIGHTING SYSTEM BRIGHTNESS CONTROL FOR A USER DEVICE

CROSS-REFERENCE TO RELATED APPLICATIONS

This application is a divisional of U.S. application Ser. No. 13/735,632, titled "Non-Linear Lighting System Brightness Control for a User Device," filed Jan. 7, 2013, now issued as U.S. Pat. No. 9,345,103, the contents of which are hereby incorporated by reference.

BACKGROUND

User devices may display a variety of content to a user under a variety of ambient light conditions. The brightness of the display may impact the quality of the viewing experience. However, based on the variety of ambient light conditions the ability to provide a consistent and high quality viewing experience may be a challenge.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for adjusting lighting system brightness based, at least in part, on using non-linear incremental changes that are made in response to adjustments to a brightness scale or brightness control interface.

A user device may include an electronic display and a front lighting system that emits light that illuminates at least a portion of the electronic display. The emitted light may enable the user to view content that may be stored on the user device. The quality of the viewing experience may depend on how well the user may see the content. The amount of light emitted from the front lighting system and the ambient light level conditions may have an impact on the viewing experience. In certain instances, the brightness or the intensity of the emitted light may need to vary to accommodate ambient light conditions or the viewing preferences of the user. The front lighting brightness may vary in a non-linear way to minimize the impact of brightness changes on the user's eye. In certain instances, changes in brightness may be viewed as harsh and varying the brightness in a non-linear manner may minimize the harshness and improve the user viewing experience.

In one embodiment, the front lighting brightness may be tied to a brightness scale that provides a variety of brightness settings a user may select or adjust to increase or decrease lighting system brightness. The brightness scale may range from low brightness level to a high brightness level that includes several brightness levels between the low and high points. The brightness scale may include any amount of settings, but in one specific embodiment, the amount of brightness settings may include 24 different levels of brightness. The front lighting system brightness may be varied based on the amount of current that may be provided to light emitting diodes in the front lighting system. In one specific embodiment, the display may include light emitting diodes (LEDs) that may emit an amount of light based, at least in part, the amount of current provided to the LEDs. In one embodiment, the brightness levels may include certain current values that are provided to the LEDs. However, the amount of current may vary on a non-linear basis between each brightness level. This may mean that the changes in current between brightness levels may not be the same amount. In certain instances, the amount of current increments between brightness levels may increase from the low point to the high point on the brightness scale.

In one specific embodiment, the brightness scale may include two or more ranges on the brightness scale. For example, the first range may cover the lower end of the brightness scale and may increment current in smaller non-linear amounts. The high range may cover the higher end of the brightness scale and may increment current in larger non-linear amounts than the low range. In another embodiment, the brightness scale may also be based on brightness emitted from the LEDs and the amount of brightness may also vary in a non-linear manner as described above. However, instead of being a current centric this method would be based, at least in part, on the amount of brightness of the display. In one specific embodiment, the brightness may be measured in luminance or Lumens. Accordingly, the brightness levels may include an amount of luminance instead of current.

In another embodiment, the non-linear function may also be based, at least in part, on historical brightness data collected by the user device during interactions with the user. In certain instances, the historical brightness data may also be compared with ambient light conditions to determine brightness preferences that may vary with ambient light conditions. For example, lighting system brightness may also be adjusted based on the ambient light conditions and visual acuity of the eye under those ambient light conditions. Under lower light conditions, eyes may be impacted by the contrast of low ambient light and the lighting system brightness. Turning on a display under low light conditions may impact the visual acuity of the user. In certain instances, the display may initially be set to a brighter setting to account for the impact of low ambient light. However, over a period of time, the eye may compensate for the low ambient light levels and the front lighting system brightness may be lowered to account for that compensation. In one specific embodiment, the user device may set a front lighting system brightness level when the ambient light conditions are less than a threshold amount (e.g., 10 Lu). The user device may lower the front lighting system brightness in a non-linear manner to compensate for the user's eyes adjusting to the low ambient light conditions. The user device may establish steady state lighting system brightness after a threshold amount of time has expired. In one specific embodiment, the amount of time may be thirty minutes with the ambient light levels being less than or equal to the threshold amount.

In another embodiment, the brightness adjustment in low ambient light conditions may also be based, at least in part, on historical brightness usage. For example, the initial set point for low light conditions may be based on the user's historical brightness adjustments under those conditions. In another embodiment, the user device may use information about the user's vision capabilities to determine the initial brightness set point and how much the brightness should ramp down over time. The vision capabilities may also be provided from an eye examination or testing of the user's eyes.

ILLUSTRATIVE METHODS

Figure 1:
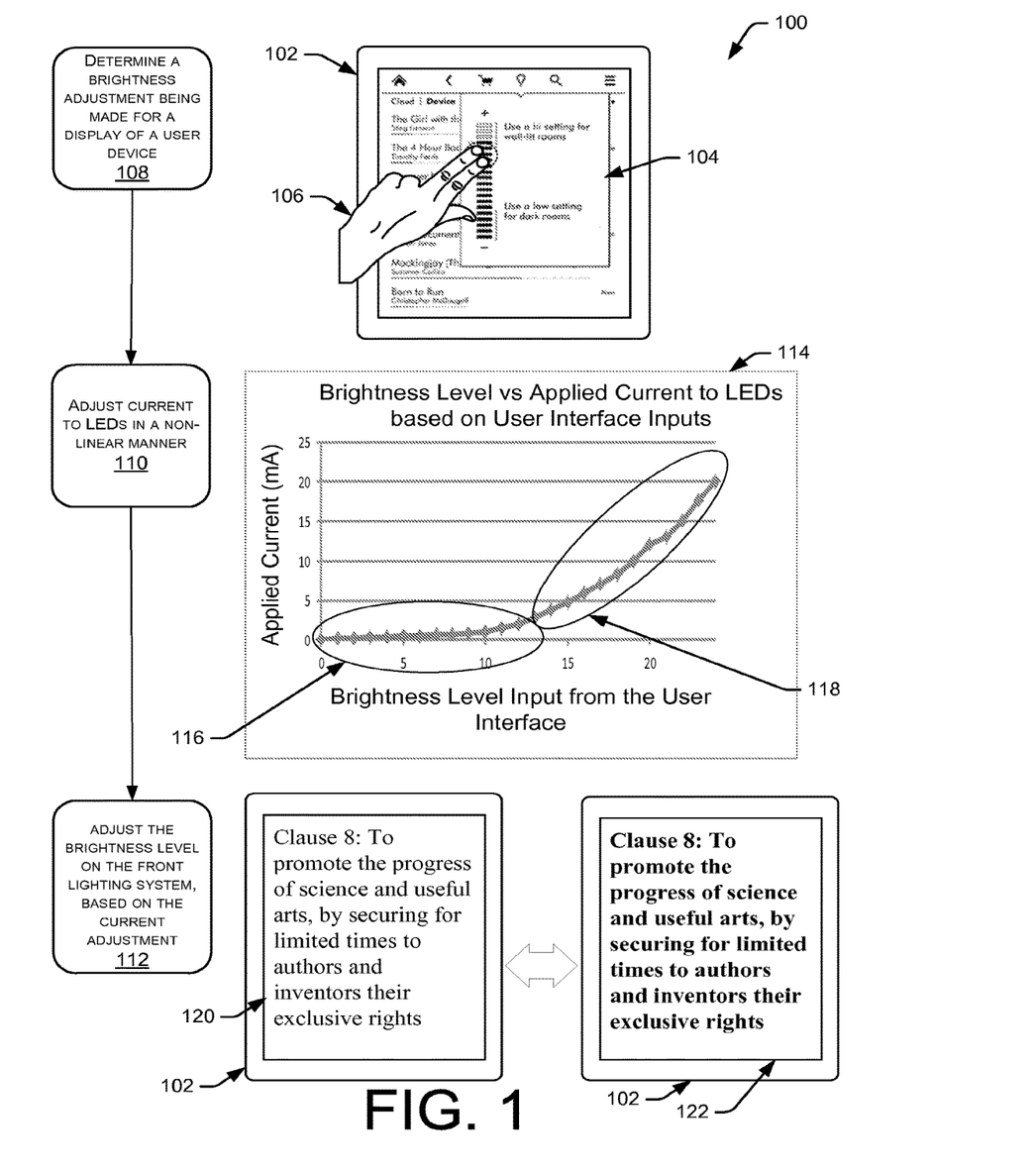
FIG. 1 illustrates a flow diagram and accompanying figures for a method for adjusting lighting system brightness based on a non-linear function in accordance with one or more embodiments of the disclosure.

FIG. 1 illustrates a method 100 for adjusting front lighting system brightness of a user device 102 based, at least in part, on a brightness scale 104 that may be adjusted or incremented by a user 106. The user device 102 may include an electronic display used to present content to the user. The content may include, but is not limited to, text, images, video, games, or any application that may be stored in memory and executed by a computer processor. The front lighting system may illuminate a surface of the electronic display.

At block 108, the user device 102 may determine a front lighting system brightness adjustment is being made by a user 106. In one embodiment, the user device 102 may display a brightness scale 104 that shows or represents levels or steps of front lighting system brightness that may be selected by a user 106. In the illustrated embodiment, the brightness scale 104 may include 24 steps. The brightness scale 104 may be adjusted using a finger gesture to slide along the brightness scale 104 to increase or decrease front lighting system brightness. However, in other embodiments, the brightness scale 104 may include any number of steps that may represent different levels of front lighting system brightness. Other embodiments may also use different adjustment techniques that may include buttons on the display screen or physical buttons or switches that may be actuated by a finger.

At block 110, the user device 102 may adjust the front lighting system brightness based, at least in part, on receiving the lighting system brightness adjustment. In one embodiment, the front lighting system brightness may be adjusted by changing the amount of current that may be applied to the front lighting system. An increase in current may increase front lighting system brightness and a decrease in current may decrease front lighting system brightness. Further, the current may be applied in a non-linear manner as the user moves up or down the brightness scale 104. This may include that the change in current between brightness scale levels may not be equal between each of the levels. For example, as seen in Table 1, the amount of current may increase in a non-linear manner between the brightness scale levels.

TABLE 1

| Brightness Scale 104 | | | | | | | | | |
| --- | --- | --- | --- | --- | --- | --- | --- | --- | --- |
| Level | 0 | 1 | 2 | 3 | 4 | 5 | 6 | 7 | 8 |
| Current (mA) | 0.078 | 0.157 | 0.235 | 0.32 | 0.39 | 0.47 | 0.55 | 0.64 | 0.7 |
| Level | 9 | 10 | 11 | 12 | 13 | 14 | 15 | 16 | 17 |
| Current (mA) | 0.8 | 1 | 1.5 | 2 | 2.8 | 3.6 | 4.8 | 5.9 | 7.1 |
| Level | 18 | 19 | 20 | 21 | 22 | 23 | 24 | | |
| Current (mA) | 8.4 | 9.9 | 12 | 13 | 15 | 17.6 | 20 | | |

As shown in Table 1, the current increases in a non-linear manner that may be represented by a quadratic or exponential function. Table 1 is illustrated in chart 106 which also shows that the non-linear nature of the current changes may be optimized over the brightness scale 104. For example, the brightness scale 104 may include a low brightness region 116 in which the amount of non-linear changes between the levels is relatively small compared to the high brightness region 118 that has larger increments of non-linear changes. In this way, the low brightness region 116 may have a higher degree of granularity than the high brightness region 118. The higher degree of granularity may account for the tendency of eyes to be more sensitive to brightness changes in low light environments. Accordingly, the low light region 116 may minimize the amount of brightness change between levels which may enhance the viewing experience by minimizing the harshness impact on the eyes due to lighting system brightness changes. However, above a threshold amount the increase in brightness in the high brightness region 118 may not be as likely to negatively impact the eyes. This may enable higher changes in brightness between the levels in the high brightness region 118 that may not negatively impact the viewing experience.

In one embodiment, the front lighting system may include light emitting diodes (LEDs) which may vary their brightness based on the amount of applied current. As shown in chart 106, the applied current may vary between 0.78 mA to 20 mA in one specific embodiment. The low brightness region 116 may include non-linear changes in current between 0.78 mA and 2 mA. The current may vary in a non-linear manner from 2 mA to 20 mA in the high brightness region 118. Chart 106 illustrates a single embodiment and in other embodiments, the current may vary between higher and lower ranges and may vary in a variety of non-linear ways that are not captured in this single embodiment.

In another embodiment, the current may vary in a combination of linear and non-linear changes. For example, certain levels may include linear changes between the levels that are separated by non-linear changes to another level in the brightness scale 104. For example, the changes between levels 2 and 4 may be linear, but the change from level 4 to 6 may be non-linear.

At block 112, the user device 102 may emit light from the front lighting system in proportion to the current that is applied to the front lighting system. In one embodiment, the current may be applied to the LEDs which may emit light in such a manner that the content that may be viewed and comprehended by the user 106. The content may include any electronically stored material or streamed material that may be provided to the user device 102 over a network (not shown).

The change in front lighting system brightness may be illustrated by the low brightness front lighting system 120 when compared to the high brightness front lighting system 122. The low brightness front lighting system 120 may have a lower amount of current applied to the LEDs than the amount of current applied to the high brightness front lighting system 122. As the user 106 adjusts between different levels on the brightness scale 104, the amount or intensity of light emitted from the front lighting systems 120, 122 may adjust accordingly. In this embodiment, the high brightness display emits a higher intensity or luminance of light than the low brightness front lighting system 120.

Figure 2:
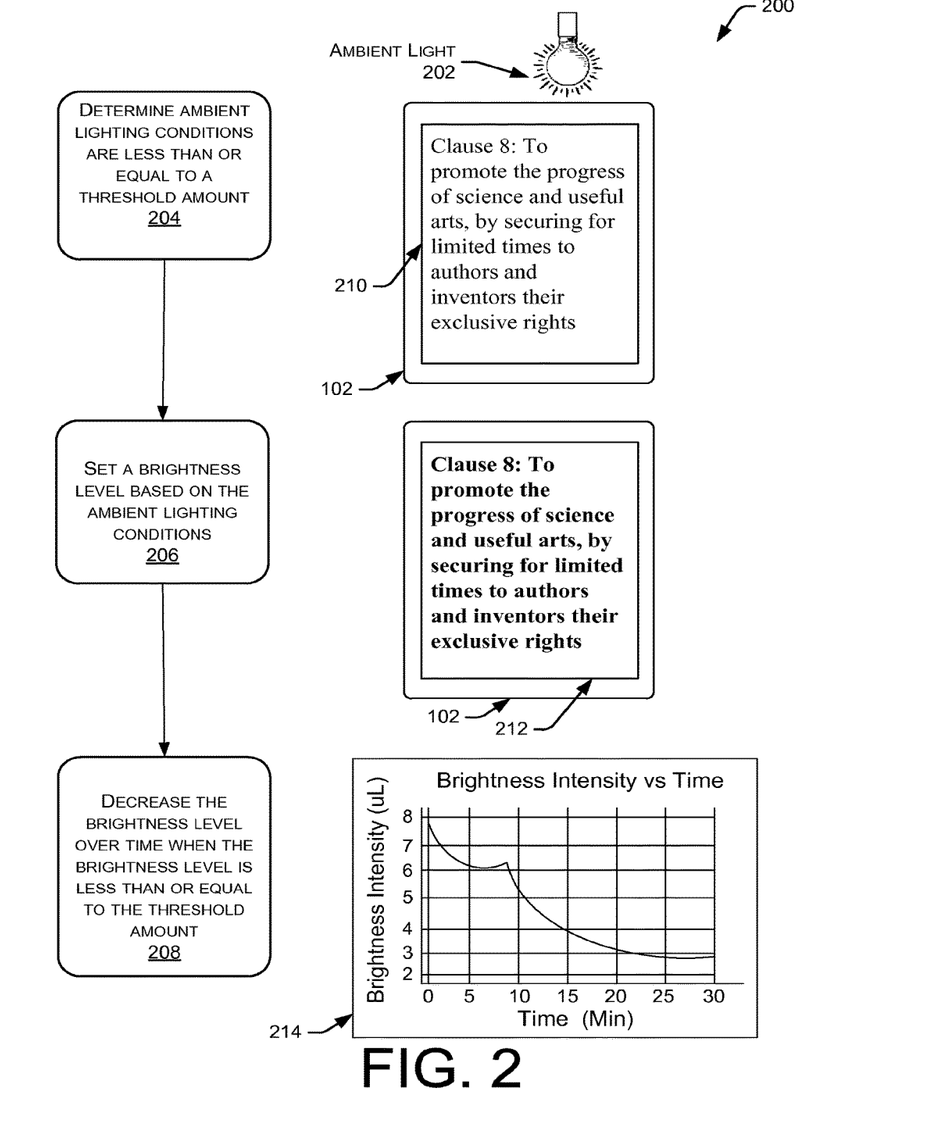
FIG. 2 illustrates a flow diagram and accompanying figures for a method for adjusting lighting system brightness over time when the user device is exposed to a low light environment in accordance with one or more embodiments of the disclosure.

FIG. 2 illustrates a flow diagram and accompanying figures for a method 200 for adjusting front lighting system brightness over time when the user device 102 is exposed to low ambient light 202 environments. Ambient light 202 may be provided by a light source that may include natural light (e.g., sun, moon) or generated light (e.g., light bulb, LED). The front lighting system brightness may be ramped down in a non-linear manner to accommodate the impact of a low light environment on a user's visual acuity. Under low light conditions, the eye may initially prefer a slightly brighter front lighting system brightness to accommodate the impact of low ambient light levels. However, over time, the eye may adjust to the low light levels and may prefer lower front lighting system brightness.

At block 204, the user device 102 may determine the ambient light 202 level may be less than or equal to a threshold amount. A light sensor (not shown) may be used to detect the amount of ambient light. The front lighting system brightness 210 may be set at a default level or any other level determined by the user 106. For example, the front lighting system brightness 210 may be at several different values depending on how or where the device may be used threshold amount is achieved. The user device 102 may be powering on and may detect the light ambient light condition during boot up. In another embodiment, the ambient light 202 level may change when a light is turned off or the user moves to a different location.

At block 206, the user device 102 may set the front lighting system brightness to certain value based, at least in part, on the meeting or exceeding the threshold amount. In one example, when the ambient light 202 is below 10 Lu, the user device 102 may set the front lighting system brightness 212 to level 10 on the brightness scale 104.

In another embodiment, the user device 102 may have several threshold amounts that are correlated with various front lighting system brightness levels. For example, the threshold amounts may include ranges of brightness that may be associated with various brightness levels. For example, a first range of ambient light conditions may include 8-10 Lu that results in a front lighting system brightness level 8. A second range of 10-12 Lu for ambient light conditions may result in a front lighting system brightness of level 10. These ranges may allow the user device 102 to account for different ambient light 202 level conditions by providing different brightness levels based on the different ambient 202 light conditions.

At block 208, the user device 102 may decrease the front lighting system brightness 212 over a period of time when the ambient light conditions are equal to or less than the threshold amount. The decrease in front lighting system brightness may be done in a non-linear manner over a period of time. As shown in the ramp down chart 214, the brightness intensity may ramp down from the brightness set point established when the ambient light conditions are less than the threshold amount.

In one embodiment, the front lighting system brightness ramp down may be incremented based, at least in part, on a unit of time for a period of time while the low light ambient conditions exist. Following the period of time, the front lighting system brightness may be set to a steady state value that does not change. Generally, eyes may acclimate to the low light conditions and over time may not need additional brightness to improve viewing conditions under a low light environment. In one specific embodiment, the period of time to reach a steady state condition may be thirty minutes.

In another embodiment, the front lighting system brightness ramp down may include a linear portion combined with a non-linear portion. Portions of the ramp down may behave in a linear manner and other portions of the ramp down may behave in a non-linear manner.

In another embodiment, the front lighting system brightness ramp down may continue until the front lighting system brightness approaches zero. Under this embodiment, the ramp down may be used to notify the user of an elapsed time to indicate an end to their viewing experience. For example, the user may set an amount of time for how long they want to use the device before going to sleep or going back to work. The front lighting system brightness dimming over a period of time informs the user that the elapsed time is coming to an end and they may go to sleep or reset/disable the ramp down timer. The user may turn off the user device 102 or the user device 102 may turn off automatically when the ramp down time expires. The front lighting system brightness may be ramped down according to a default ramp down function or the user may select or generate a ramp down function based on their preferences.

Figure 3:
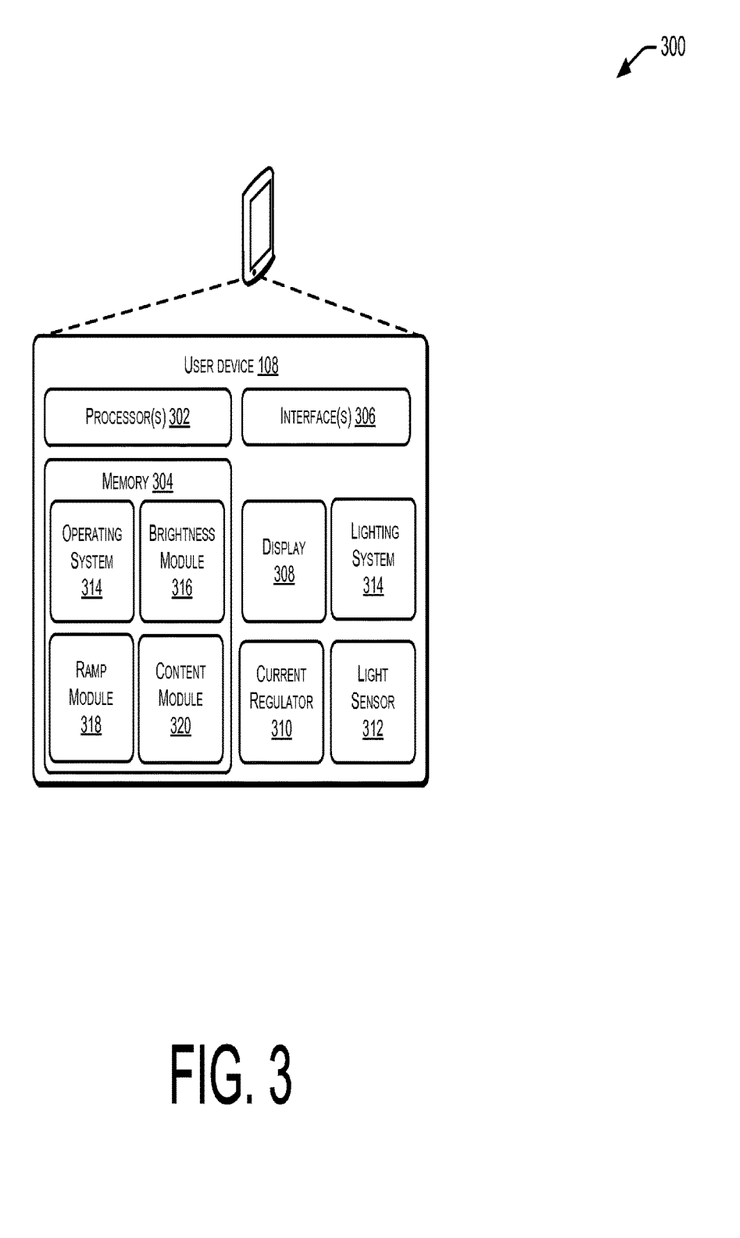
FIG. 3 illustrates a system used to adjust lighting system brightness based on non-linear functions in accordance with one or more embodiments of the disclosure.

FIG. 3 illustrates a system 300 for adjusting front lighting system brightness based on non-linear functions when ambient light conditions may be less than or equal to the threshold amount. The system 300 may be used to adjust front lighting system 314 brightness based on inputs received from the user 106 or to use default brightness settings based on user history or predetermined values. The front lighting system 314 may comprise light emitting diodes (LEDs) that may be placed adjacent to the display 308. The LEDs may emit light that illuminates a surface of the display 308.

The user device 102 may include, but is not limited to, smartphones, mobile phones, laptop computer, desktop computer, tablet computers, televisions, set-top boxes, game consoles, in-vehicle computer systems, and so forth.

The user device 102 may include one or more processors 302, a memory 304, and one or more network and input/output interfaces 306, a display 308, a current regulator 310, a light sensor 312, and a front lighting system 314.

The computer processors 302 may comprise one or more cores and are configured to access and execute (at least in part) computer-readable instructions stored in the one or more memories 304. The one or more computer processors 302 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 302 and one or more of the other components of the user device 102. In certain embodiments, the user device 102 may be based on an Intel® architecture or an ARM® architecture and the processor(s) 302 and chipset may be from a family of Intel® processors and chipsets. The one or more processors 302 may also include one or more application-specific integrated circuits (ASICs) or application-specific standard products (ASSPs) for handling specific data processing functions or tasks.

The network and I/O interfaces 306 may also comprise one or more communication interfaces or network interface devices to provide for the transfer of data between the user device 102 and another device (e.g., network server) via a network (not shown). The communication interfaces may include, but are not limited to: personal area networks ("PANs"), wired local area networks ("LANs"), wireless local area networks ("WLANs"), wireless wide area networks ("WWANs"), and so forth. In FIG. 3, the user device 102 may be coupled to the network via a wired connection. However, the wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the user device 102 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth. The interfaces may also include one or more detection devices to detect the type, orientation, and/or the implementation of the hand gesture 106. The detection devices may include, but is not limited to, touch components, image components, infrared components, ultrasonic components, and/or electromagnetic components.

The touch components may be incorporated into the display screen of the user device 102. However, the touch components may also be incorporated into the surface of the user device 102, which may not include the display screen. The touch components may include pressure sensitive elements that may be able to determine how many fingers are in physical contact with the user device 102. They may also determine the direction, pressure, and/or distance between the fingers when the fingers are sliding across the surface and/or in physical contact with the user device 102. In one embodiment, the touch components may include a capacitive sensing device that may detect the presence of one or more fingers when the fingers are coupled (e.g., touching the screen) with the touch components.

The image components may be able to detect electromagnetic radiation within the visible light spectrum of 390 nm-750 nm. The image components may be used to generate one or more images of the hand and fingers to determine the number of fingers, the orientation of the fingers, and/or the direction of the hand/finger movements. The one or more images may be analyzed separately or a as a group to determine the type and orientation of the hand gesture. The image components may include, but are not limited to, a camera, a complementary metal oxide (CMOS) image sensor, or a charge coupled device (CCD) image sensor. The image components may be any device that converts an optical image into an electrical signal.

The infrared components may detect to detect electromagnetic radiation within the infrared light spectrum of 750 nm-1 mm. The infrared components may be used to generate one or more images of the hand and fingers to determine the number of fingers, the orientation of the fingers, and/or the direction of the hand movements. The infrared components may be arranged to detect the hand gesture whether the gesture includes or does not include physical contact with the user device 102. The one or more images may be analyzed separately or a as a group to determine the type and orientation of the hand gesture. The infrared components may include, but are not limited to, a pyroelectric sensor that generates an electrical charge when exposed to heat in the form of electromagnetic radiation.

The ultrasonic components may detect hand gestures using radio or sound waves that are emitted by the user device 108 (or another device) and that are received at the user device 102 (or another device) after being reflected off of the hand and/or fingers. The ultrasonic components may include, but are not limited to, piezoelectric components that generate an electrical signal when a force or wave is applied to them. The ultrasonic components may detect the hand gesture that is contact with or not in contact with the user device 102.

The electromagnetic components that may detect electromagnetic fields that may be generated by the user device 102 (or another device) that are modulated by the presence of the hand 110 and fingers in the electromagnetic field. The user device 102 may be able to determine the orientation and type of the hand gesture to include the number of fingers and their movement near or on the user device 102.

The one or more memories 304 comprise one or more computer-readable storage media ("CRSM"). In some embodiments, the one or more memories 304 may include non-transitory media such as random access memory ("RAM"), flash RAM, magnetic media, optical media, solid state media, and so forth. The one or more memories 304 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 304 may store an operating system 314 that includes a plurality of computer-executable instructions that may be implemented by the processor 302 to perform a variety of tasks to operate the interface(s) 306 and any other hardware installed on the user device 102. The memory 304 may also include a brightness module 316, a ramp module 318, and/or a content module 320.

The brightness module 316 may control the front lighting system brightness for the user device 102. The display 308 may include any electronic display that may present content to a user. The brightness module 316 may control front lighting system brightness via a brightness scale 104 that enables the user to increment between brightness levels, as shown in Table 1. The brightness module 316 may present the brightness scale 104 to the user 106 who may increase or decrease the front lighting system brightness. As noted above in the description of FIG. 1, the brightness scale 104 may adjust front lighting system brightness in a non-linear manner. This may even occur when the brightness scale displayed on the front lighting system 314 may not indicate that the brightness increments are non-linear. As noted above in FIG. 1, the brightness scale 104 may include a low brightness range 116 that may increment brightness in smaller increment than the high brightness range 118 which may increment brightness in larger increments. However, the increments in both ranges may be non-linear, linear, or a combination thereof.

In another embodiment, the brightness module 316 may receive brightness adjustments from the user from a button or switch (not shown) instead of through the display 308.

In one embodiment, the brightness module 316 may control a current regulator 310 that provides current to the display 308. The lighting system brightness may be increased by enabling the current regulator 316 to provide a higher amount of current to the display 308. The display 308 may include light emitting diodes that transform the current into light that may be viewed by the user 106. The current regulator 310 may increment the current in non-linear increments, as shown in Table 1, to provide various brightness levels to the user 106. The current regulator 310 may throttle the amount of current that may be provided by a power supply (not shown) in the user device 102 or from remote power supply (not shown) that may be coupled to the user device 102.

The ramp module 318 may be used in conjunction with the brightness module 316 to ramp down the lighting system brightness when the user device 102 is exposed to low ambient light conditions. The ramp module 318 may include one or more non-linear functions that may direct the brightness module 316 to decease lighting system brightness as needed. An example of the non-linear function is shown in chart 214. The ramp module 318 may decrease lighting system brightness over time and may achieve steady state lighting system brightness after a period of time has elapsed. In one embodiment, the ramp module 318 may continue to ramp down lighting system brightness when the ambient light condition may be less than one or more threshold amounts. The ramp module 318 may receive ambient light conditions from a light sensor 312. In another embodiment, the ambient light conditions may be determined by the location and/or time of day. The user device 102 may include a clock (not shown) and location detection equipment (e.g., global positioning system). The user device 102 may determine the user device 102 is outside and the time of day may use the information to determine the ambient light conditions.

The content module 320 may include any content that may be stored on the user device 102. The content may include, but is not limited to, music, video, applications, games, and/or social media interfaces.

The lighting system 314 may include a light source disposed in a manner that light may illuminate a surface of the display 308. In one embodiment, the lighting system 314 may include light sources that may be located around the perimeter of the display 308. For example, the lighting system may include LEDs that may be placed near the edge of the display and may illuminate at least a portion of the display 308 surface. In another embodiment, the lighting system may include one or more light sources that may located near the display 308. The location of the one or more light sources may be along at least one edge of the display. The placement of the one or more light sources along the at least one edge may be done in a manner that enables light to shone on the surface of the display.

Figure 4:
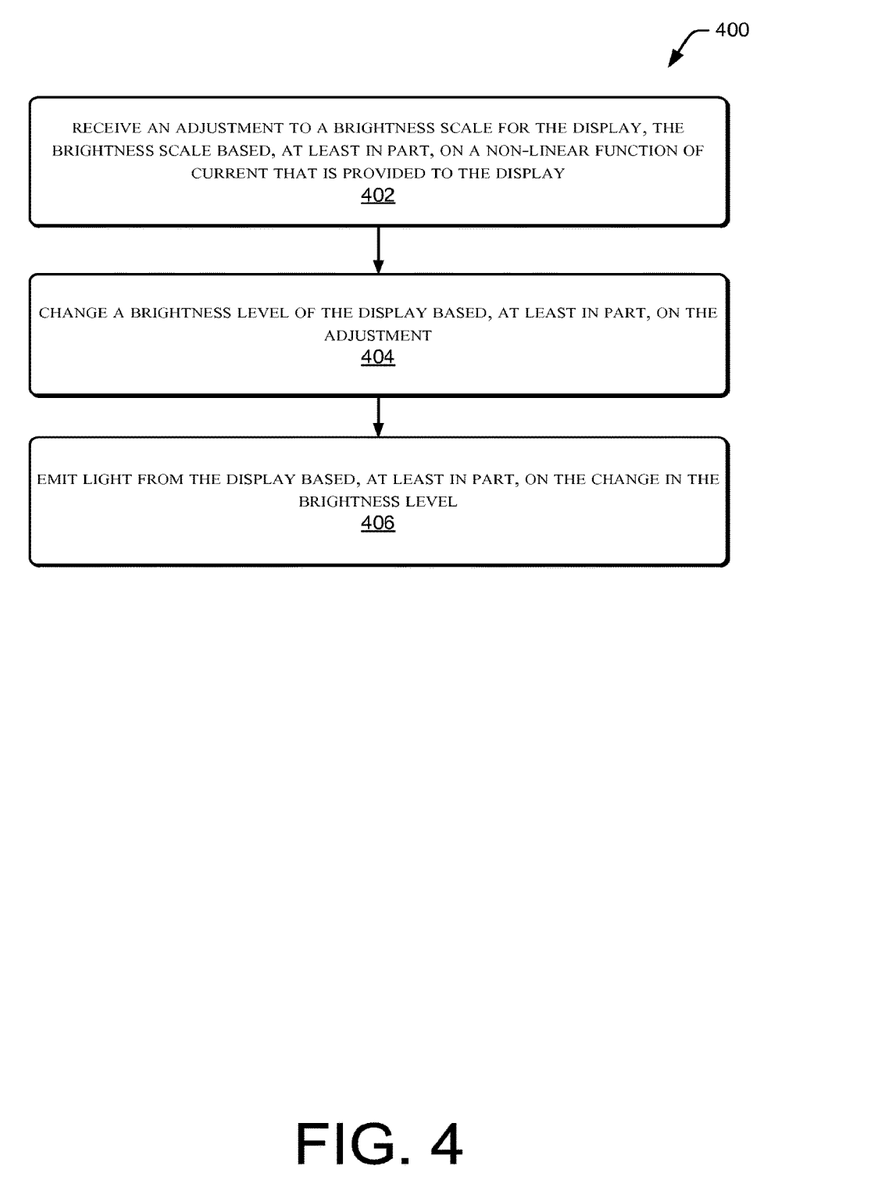
FIG. 4 illustrates a flow diagram for a method for adjusting lighting system brightness based on a non-linear function in accordance with one or more embodiments of the disclosure.

FIG. 4 illustrates a flow diagram for a method 400 for adjusting front lighting system brightness based on a non-linear function for current applied to the front lighting system or front lighting system brightness. Front lighting system brightness changes may be measured based, at least in part, on current that is provided to the front lighting system. Current flow may be measured in units of Amperes or Amps. Front lighting system brightness may be measured or categorized in terms of luminance or lumens. The non-linear changes in front lighting system brightness may be measured in the amount of current or luminance changes for the different levels of the brightness scale 104.

At block 402, the user device 102 may receive an adjustment to a brightness scale 104 for the front lighting system 314. The brightness scale 104 may be based, at least in part, on a non-linear function of current that is provided to the front lighting system 314. The non-linear function may include unequal increments of current between the levels of the front lighting system. The current chart 114 and Table 1 illustrate at least one embodiment of the non-linear function that varies current per the levels of the brightness scale 104. The current chart 114 is merely one example of a non-linear function demonstrating the unequal changes in current and the magnitudes of the current values.

In one embodiment, the front lighting system brightness may be increased or decreased by applying different magnitudes of current to the light emitting diodes in the front lighting system 314. As the current increases, the front lighting system brightness increases and as the current decreases the front lighting system brightness decreases in a corresponding manner.

In another embodiment, the front lighting system brightness may be measured in terms of luminance. The non-linear function may apply to the luminance emitted from the light emitting diodes and the changes in luminance between the levels of the brightness scale 104 may also unequal.

At block 404, the user device 102 may change the brightness level of the front lighting system based, at least in part, on the adjustment that was received from the user 106. For example, the user device may change from a brightness level of 6 (i.e., Table 1) to a brightness level of 10. The brightness level may also be decreased from level 6 to level 3 based, at least in part, on the type of adjustment made by the user 106.

At block 406, the user device 102 may emit light from the front lighting system based, at least in part, on the change in the brightness level. The light emitting diodes may receive a different amount of current that may be converted to light that may be viewed by the user 106.

In another embodiment, the user device 102 may account for changes in ambient light conditions 202. For example, a user 106 may turn off a light or move to a different location that has a different light source. The change in ambient light conditions 202 may alter the user's ability to view the content on the display. Under certain low light conditions, the eye may adjust over time to the new ambient light conditions. Accordingly, the front lighting system brightness may be altered to optimize the viewing experience when the eye's vision performance changes over time. Initially, the eye may prefer a slightly brighter front lighting system upon exposure to a light ambient light condition 202. Over time, the eye may adjust and content viewing may be optimized or improved by ramping down the front lighting system brightness as the eye becomes acclimatized to the low ambient light condition.

In one embodiment, the user may determine an ambient light level condition 202 that is equal to or less than a threshold amount. In one specific embodiment, the ambient light level condition 202 may be less than or equal to 10 Lu. The user device 102 may set a front lighting system brightness level based, at least in part, on the ambient light level condition 202. The front lighting system brightness level may be based, at least in part, on user preferences or based on a default that level that may have been optimized for one or more ambient light conditions. The user device 102 may ramp down the front lighting system brightness level over a period of time as the eye becomes acclimatized to the low ambient lighting 202. In one embodiment, the ramp down rate may be based, at least in part, on a non-linear function that decreases the front lighting system brightness level over the period of time. For example, the non-linear changes to the front lighting system brightness may be done by changing the front lighting system brightness in unequal brightness increments over a period of time. The amount of change between increments may occur faster during the beginning of the ramp down and slow down towards the end of the ramp down period. In one specific embodiment, the ramp down chart 214 shows an initial ramp down function that slows down over a first brightness range during a first time period. The second ramp down range may increase in ramp down rate initially and may slow down the ramp down rate until the front lighting system brightness reaches a steady state at the end of the time period.

In another embodiment, the ramp down rate may be based, at least in part, on a non-linear logarithmic function that decreases the current flow to the LEDs or the front lighting system brightness over the period of time.

Figure 5:
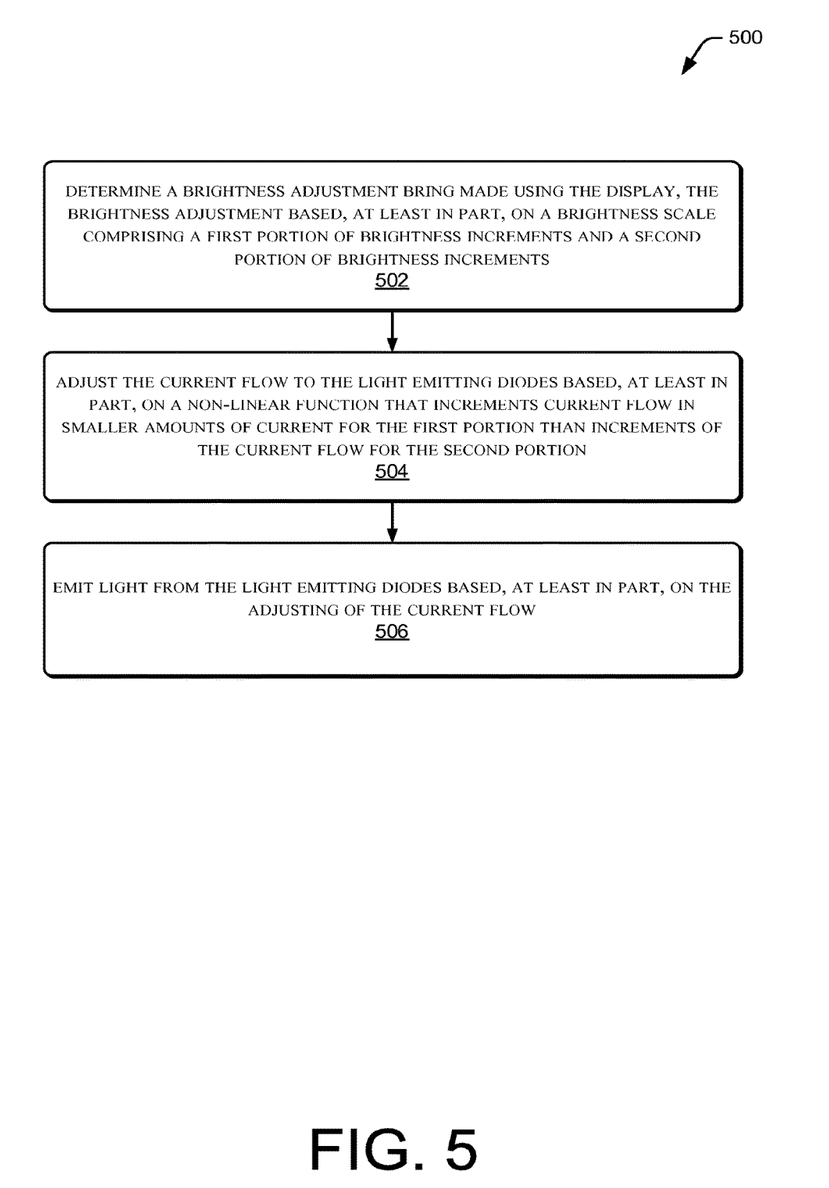
FIG. 5 illustrates another flow diagram for a method for adjusting lighting system brightness based on a non-linear function in accordance with one or more embodiments of the disclosure.

FIG. 5 illustrates a flow diagram for a method 500 adjusting front lighting system brightness based on a non-linear function that may include two incremental regimes within the brightness scale 104. Brightness changes under low ambient light conditions may impact the user's eye more than brightness changes under higher ambient light conditions. Accordingly, the user device 102 may minimize the brightness scales 104 brightness increments to smaller amounts to minimize the harshness of brightness changes. However, under brighter ambient light conditions, the brightness scale 104 may increment in higher increments of brightness since the impact of higher increments may not have a harsh impact on the user's eyes.

At block 502, the user device 102 may determine a brightness adjustment being made using the front lighting system 314. In this embodiment, the user 106 may interface with a touch display to make adjustments to the brightness scale 104. The brightness scale 104 may include a first portion of brightness increments and a second portion of brightness increments as illustrates in the brightness chart 114. The first region may include levels 0-12 that increment brightness in smaller increments than the second regions (e.g., levels 13-24). In this embodiment, the first region of the brightness scale 104 may accommodate a lower ambient light level range than the second portion of the brightness scale 104. The brightness chart 114 is merely one example of how the brightness scale 104 may be designed to accommodate the user's eye performance under different ambient light conditions. The amount of levels and the magnitude of the increments may also be based on historical brightness usage by the user.

At block 504, in response to the adjustment, the user device 102 may adjust the current flow to the front lighting system (e.g., light emitting diodes) using a non-linear function that increments current flow in smaller amounts of current for the first region of the brightness scale 104 than the increments of the current flow for the second portion of the brightness scale 104.

At block 506, in response to the current flow change, the user device 102 may emit light from the light emitting diodes. The user 106 may view the light and may be able to interact or read the content that may be displayed by the user device 102.

Figure 6:
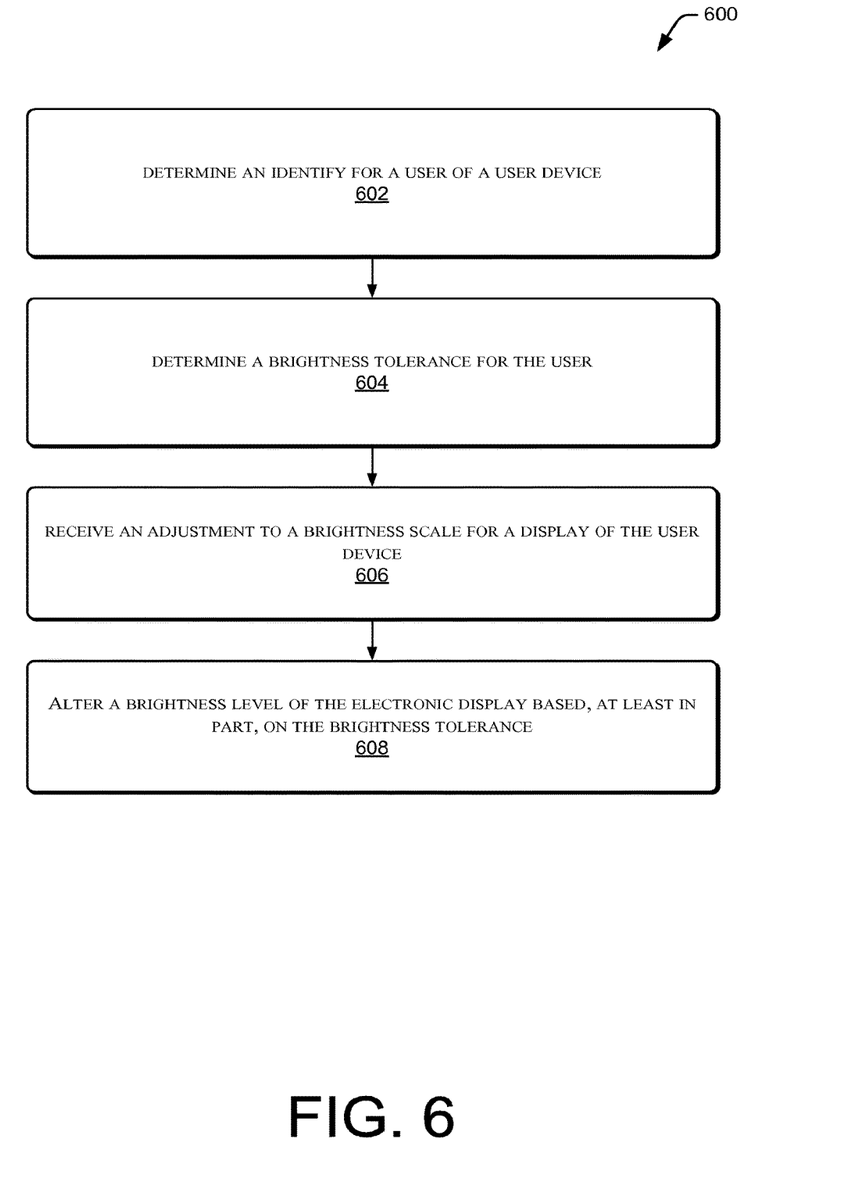
FIG. 6 illustrates a flow diagram for a method for adjusting lighting system brightness based on a non-linear function and historical brightness data in accordance with one or more embodiments of the disclosure.

FIG. 6 illustrates a flow diagram for a method 600 for adjusting front lighting system brightness based on a non-linear function and/or historical brightness data. The user device 102 may be able to incorporate user 106 brightness preferences based, at least in part, on how the user adjusts the front lighting system brightness over time. The brightness history may also include correlations with the ambient light conditions.

At block 602, the user device 102 may determine a user's identity. This may be done using a login or password feature that may be used to unlock the user device 102. In another embodiment, the user device 102 may use a camera to capture an image of the user 106 and compare the image to an image on stored in memory 304.

At block 604, upon determining the user's identity, the user device 102 may determine a brightness tolerance for the user 106. The brightness tolerance may be an indication of how one or more eyes of the user is impacted by light intensity or brightness. The brightness tolerance may be based, at least in part, on historical brightness usage by the user 106 and/or historical ambient light level conditions. The user device 102 may determine which brightness levels the user has used over time. In certain instances, the user device 102 may determine which brightness levels may have been used for certain applications. For example, the user 106 may have used certain brightness range when reading text and another brightness range when viewing video, a game, or another application. In another embodiment, the brightness preferences may be coupled with ambient light conditions. For example, the user's 106 brightness preferences for reading text may change under with different ambient light conditions. This may also be reflected in the time of day and location, such as when the user is reading at night before bed or reading outside during the afternoon.

In another embodiment, the brightness tolerance may be based, at least in part, brightness impact testing on the eyes of the user 106. In this instance, the user 106 may have had their eyes tested to determine which brightness levels or ranges were demonstrated to have the least impact on their eyes. The testing may include several brightness levels at different ambient light conditions. The information may be provided to the user device 102 which may design brightness scale 104 based, at least in part, on the test results.

At block 606, the user device 102 may receive an adjustment to a brightness scale for a front lighting system of the user device 102. As noted above, the adjustment may be made using a touch display interface or a button or switch incorporated into the user device 102.

At block 608, upon receiving the adjustment, the user device may 102 may alter, an illumination level of the front lighting system, the altering of the brightness level of the front lighting system may be based, at least in part, on the brightness tolerance. The brightness level may be changed by altering the amount of current that may be provided to the front lighting system from an internal or remote power supply.

The historical brightness data may also be used in optimizing the ramp down chart 214 to accommodate the user's 106 preferences for front lighting system brightness under low ambient light conditions.

Figure 7:
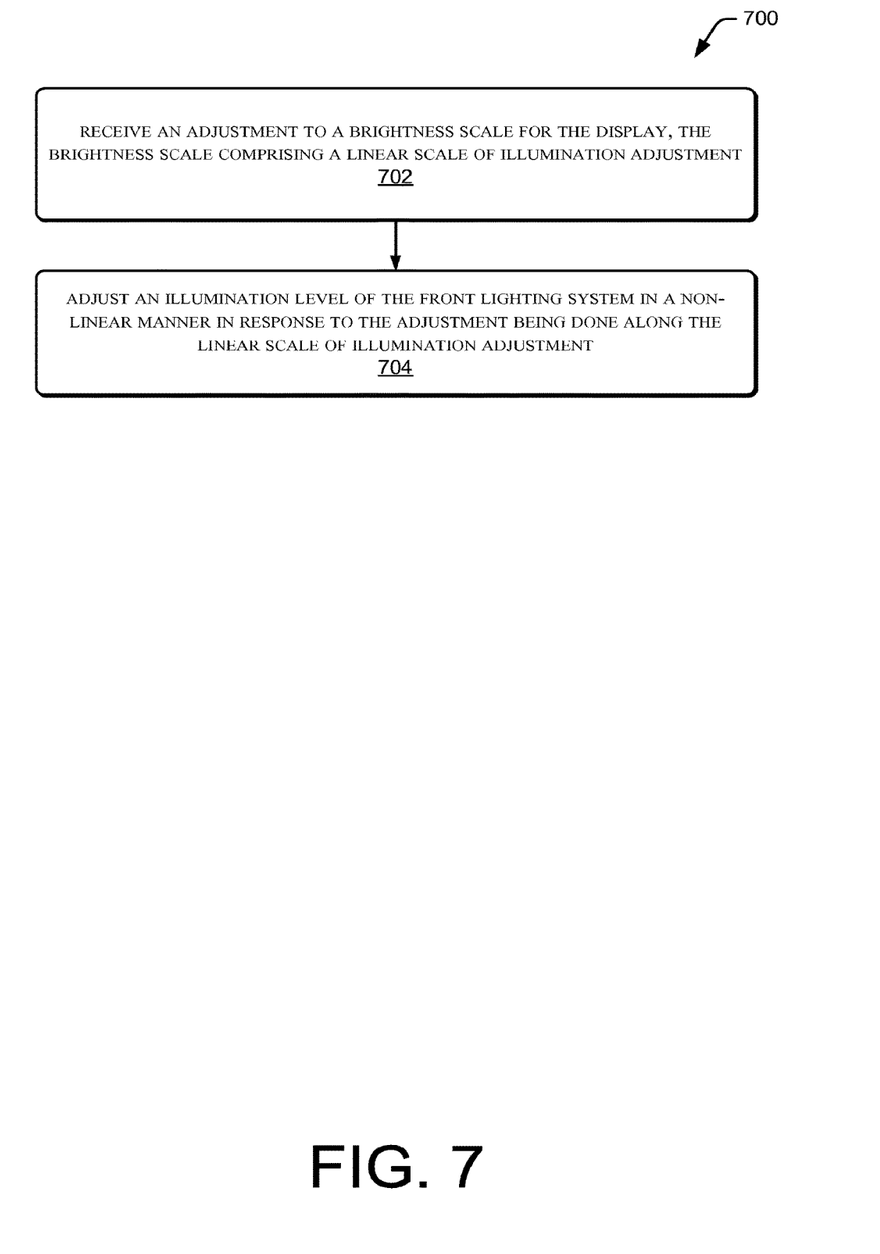
FIG. 7 illustrates a flow diagram for another method for adjusting lighting system brightness based on a non-linear function and historical brightness data in accordance with one or more embodiments of the disclosure.

FIG. 7 illustrates a flow diagram for another method 700 for adjusting lighting system brightness based on a non-linear function and/or historical brightness data. The lighting system 314 may be adjusted to emit different levels of light that may be shone on a surface of the display 308.

At block 702, the user device 102 may receive an adjustment to a brightness scale for a front lighting system 314. The brightness scale may a linear scale of illumination adjustment that has several set points that the user may adjust between. For example, the linear scale may include set points from one to ten, with one being the lowest illumination level and ten being the highest illumination level in one specific embodiment. The levels between one and ten may include different illumination levels that are between the illumination levels for the one and ten set points.

In one embodiment, the adjustment may be made by touching an interactive control element that is presented on the display 308. The user may use their finger or an interface device (e.g., mouse) to make the adjustment. In another embodiment, the adjustment may be made by interacting with a control element embedded into the user device 102. The embedded control element may be a button or switch that may be adjusted by the user.

At block 704, the user device 102 may adjust an illumination level of the front lighting system in a non-linear manner in response to the adjustment being done along the linear scale of illumination adjustment. The amount of illumination changes between the different levels may vary in a non-linear manner. In one embodiment, the non-linear manner may mean that the amount of illumination changes between the levels may be unequal to each other or different from each other. In one embodiment, the amount of brightness or current change between levels may vary such that the amounts between one or more levels have different quantities. In another embodiment, the non-linear manner may include some levels that may share the same amount change between one or more levels. Hence, the illumination changes may be modeled in a non-linear function, but one or more portions of the non-linear function may have some linear regions.

In another embodiment, the non-linear changes in the illumination level may include a first range of illumination level changes that change at lower amounts than a second range of illumination levels. For example, the first range of increments 116 in the illumination levels corresponds to a first non-linear rate of change for the brightness level of the front lighting system. The second range of increments 118 in the illumination levels corresponds to a second non-linear rate of change of brightness level, the second non-linear rate being greater than the first non-linear rate. Accordingly, the amount of change in the illumination levels in the first range 116 is smaller than the amount of change in the illumination levels in the second range 118.

In another embodiment, the non-linear manner may be based, at least in part, on an eye exam that indicates how brightness impacts vision of a user. The non-linear function may be adjusted based, at least in part, on the eye exam that indicates how the user reacts to different levels of brightness. For example, when the user is more sensitive to light under low light conditions, the amount of changes in illumination may be reduced between the illumination levels in the first range 116. In another instance, when the user is more sensitive to light under relatively higher light conditions, the amount of changes in illumination may be reduced between the illumination levels in the second range 118. The types of changes that may be made to the non-linear function may be aligned the results of the eye exam. The changes may be made to improve the user's viewing experience to compensate for any sensitivity to brightness.

Figure 8:
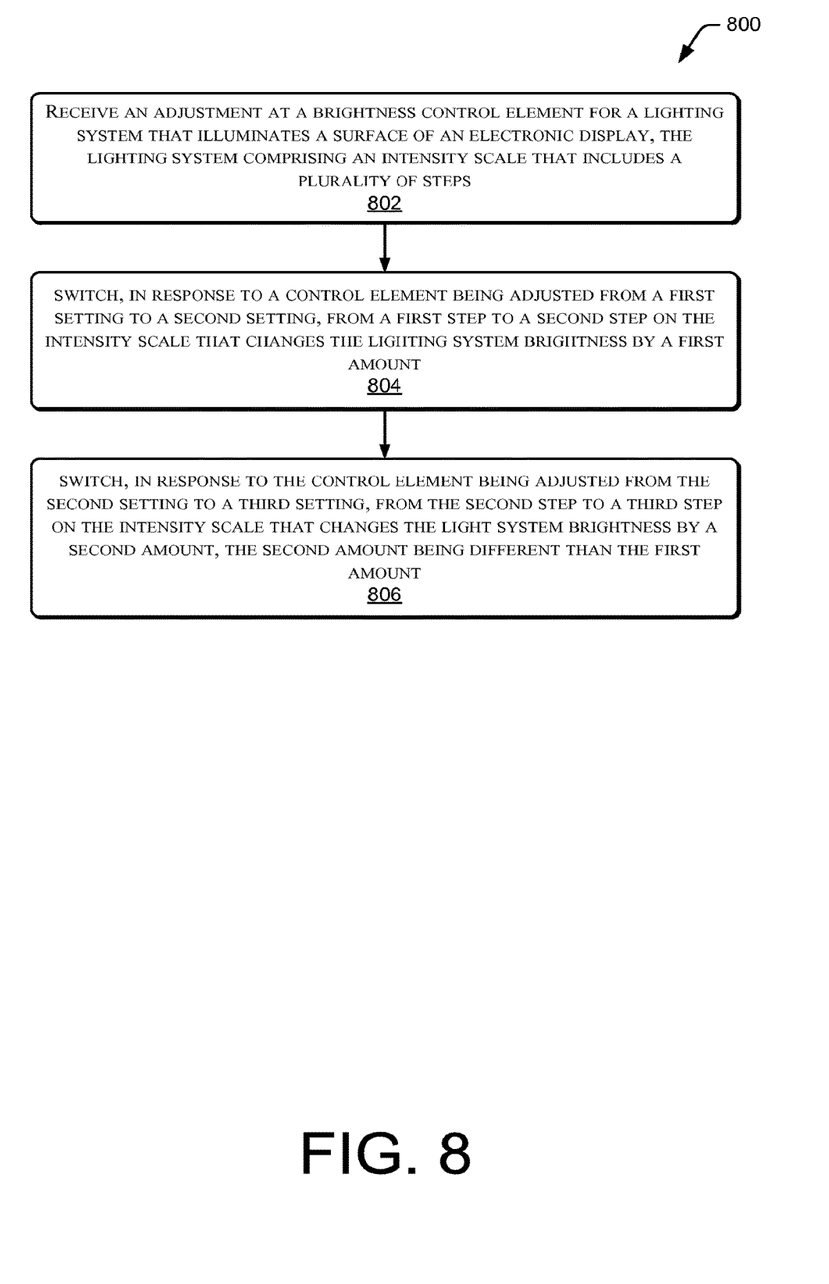
FIG. 8 illustrates a flow diagram for another method for adjusting lighting system brightness based on a non-linear function and historical brightness data in accordance with one or more embodiments of the disclosure.

FIG. 8 illustrates a flow diagram for another method 800 for adjusting lighting system 314 brightness based on a non-linear function and/or historical brightness data.

At block 802, the user device 102 may receive an adjustment at a control element (e.g., brightness scale 104) for a lighting system 314 that illuminates a surface of an electronic display 308. In this embodiment, the lighting system 314 comprising an intensity scale that includes a plurality of steps. One example of the steps may be illustrated in the 24 steps in the current chart 114.

In one embodiment, the intensity scale may be based, at least in part, on a user history of brightness usage and/or ambient light level conditions. The user device 102 may track the brightness level settings to determine which settings the user may prefer. The user device 102 may generate an intensity scale that reflects the user's preferences and may ask the user for permission to change the intensity scale. In certain instances, the user device 102 may determine a user's preference may be correlated to ambient light level conditions. For example, the user may prefer a higher brightness level under low light conditions than the default user device 102 settings. Accordingly, the user device 102 may adjust the non-linear function to increase the brightness level at the lower of the intensity scale.

In another instance, the intensity scale may be based, at least in part, on an eye exam of the user. The eye exam indicating the user has sensitivity to brightness and the intensity scale may be adjusted or generated to account for the user's sensitivity.

At block 804, the user device 102 may switch from a first step to a second step on the intensity scale that changes the lighting system brightness by a first amount. The switch may be made in response to the control element 104 being adjusted from a first setting to a second setting. In one specific example, the control element setting may be changed from step 5 on the current chart 114 to step 6 on the current chart 114. By switching from step 5 to step 6, the brightness of the lighting system 314 will change by a discrete amount (e.g., first amount). The magnitude of the brightness may be correlated to the current provided to the LEDs. Step 5 may have a current value of 0.47 mA and step 6 may have a current value of 0.55 mA (See, Table 1). Therefore, the first amount may be 0.08 mA, which may be the different in current from step 5 to step 6. Hence, the change in brightness of the lighting system 314 may be quantified by the change in current, which is 0.07 mA.

At block 806, the user device 102 may switch from the second step to a third step on the intensity scale that changes the lighting system 314 brightness by a second amount. In one embodiment, the second amount may be a different amount than the first amount described in the description of block 804. For example, the first amount and the second amount may not be equal to each other. In this instance, the second amount may be greater than the first amount. In a continuation of the previous example, the brightness setting may be changed from step 6 to step 7. As noted in Table 1, step 6 has a current value of 0.55 mA and step 7 has a current value of 0.64 mA. Hence, the second amount may be the difference between steps 6 and 7, which may be 0.09 mA.

Next, the user device 102 may switch from the third step to a fourth step in response to the control element 104 being adjusted from the third setting to a fourth setting. The change in the settings may result in changing the lighting system 314 brightness by a third amount. In this case, the third amount may different than the first amount and/or the second amount. In a continuation of the previous example, the brightness setting may be changed from step 7 to step 8. As noted in Table 1, step 7 has a current value of 0.64 mA and step 8 has a current value of 0.7 mA. Hence, the third amount may be the difference between steps 6 and 7, which may be 0.06 mA.

In a continuation of this embodiment, the user device 102 may switch from the fourth step to a fifth step in response to the control element being adjusted from the fourth setting to a fifth setting, The change in the settings may result in changing the lighting system 314 brightness by a fourth amount. In this instance, the fourth amount may be different than the first amount, the second amount, and/or the third amount. In a continuation of the previous example, the brightness setting may be changed from step 8 to step 9. As noted in Table 1, step 8 has a current value of 0.7 mA and step 9 has a current value of 0.8 mA. Hence, the second amount may be the difference between steps 6 and 7, which may be 1 mA.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:
1. A system, comprising:
 a display;
 a plurality of light emitting diodes that illuminate a surface of the display;

a light sensor;
at least one memory that stores computer-executable instructions; and
at least one processor configured to access the at least one memory and execute the computer-executable instructions to:
determine an ambient light level using the light sensor;
determine that the ambient light level is equal to or less than a threshold amount;
provide a first current to the plurality of light emitting diodes, the first current resulting in a first illumination level for the plurality of light emitting diodes;
determine that a first period of time has elapsed, during which the ambient light level is equal to or less than the threshold amount; and
provide a second current to the plurality of light emitting diodes, the second current being lower than the first current and resulting in a second illumination level lower than the first illumination level, wherein a first transition from the first current to the second is based at least in part on a first non-linear function.

2. The system of claim 1, wherein the computer-executable instructions to provide the second current include computer-executable instructions to transition from the first current to the second current using a non-linear function.

3. The system of claim 1, wherein the at least one processor is configured to:
provide a third current to the plurality of light emitting diodes, the third current resulting in a third illumination level for the plurality of light emitting diodes;
determine that a second period of time has elapsed; and
provide a fourth current to the plurality of light emitting diodes, the fourth resulting in a fourth illumination level lower than the third illumination level, wherein a second transition from the third current to the fourth current occurs using a linear function.

4. The system of claim 1, wherein the non-linear function is non-linear with respect to time.

5. The system of claim 1, wherein the non-linear function is non-linear with respect to current.

6. A system, comprising:
a display;
a front lighting system to provide illumination to a surface of the display;
a memory that stores computer-executable instructions; and
at least one processor configured to access the at least one memory and execute the computer-executable instructions to:
determine that an ambient light level is equal to or less than a threshold;
determine to make an adjustment in illumination emitted by the front lighting system from a first illumination level to a second illumination level;
adjust the illumination emitted by the front lighting system from the first illumination level to a third illumination level using first non-linear increments of current provided to the front lighting system; and
adjust the illumination emitted by the front lighting system from the third illumination level to the second illumination level using second non-linear increments of current provided to the front lighting system while the ambient light level is equal to or less than the threshold amount, wherein the first non-linear increments of current are less than the second non-linear increments of current.

7. The system of claim 6, wherein a first time lapse occurs between the first illumination level and the third illumination level, and a second time lapse occurs between the third illumination level and the second illumination level.

8. The system of claim 7, wherein the first time lapse is based at least in part on a first non-linear function, the second time lapse is based at least in part on a second non-linear function and the first non-linear function is different from the second non-linear function.

9. The system of claim 6, wherein the computer-executable instructions to determine the adjustment to be made include computer-executable instructions to:
determine to make the adjustment in illumination based on the ambient light level being less than or equal to the threshold.

10. The system of claim 6, wherein the computer-executable instructions to determine the adjustment to be made include computer-executable instructions to determine an input, wherein the input is indicative of the second illumination level.

11. The system of claim 6, wherein the computer-executable instructions to adjust an amount of illumination emitted by the front lighting system from the first illumination level to a third illumination level include computer-executable instructions to determine a brightness scale.

12. The system of claim 11, wherein the brightness scale includes a first portion and a second portion, wherein the first increments of current are associated with the first portion and the second increments of current are associated with the second portion.

13. The system of claim 12, wherein the computer-executable instructions to adjust the amount of illumination emitted by the front lighting system from the first illumination level to a third illumination level include computer-executable instructions to adjust a current a light emitting diode of the front the lighting system from a first current to a second current using the first current increments.

14. A method comprising:
determining, by one or more computer processors coupled to at least one memory, a user profile for a user of a user device;
determining historical brightness setting data of a front lighting system using the user profile, wherein the historical brightness data comprises a first illumination value corresponding to a first ambient light level and a second illumination value corresponding to a second ambient light level, wherein the front lighting system illuminates a display surface of the user device;
determining a present ambient light level corresponds to the first ambient light level;
determining that the first illumination value is associated with the first ambient light level; and
adjusting an amount of illumination emitted by the front lighting system using the first illumination value.

15. The method of claim 14, further comprising:
determining a comparison value of the historical brightness setting data to the present ambient light level, wherein the first illumination value is based at least in part on the comparison value.

16. The method of claim 14, further comprising:
determining preferences of the user profile, wherein the first illumination value is based at least in part on the preferences.

17. The method of claim 14, further comprising:
determining a historical ambient light level, wherein the first illumination value is based at least in part on the historical ambient light level.

18. The method of claim 14, further comprising:
determining that the present ambient light level is equal to or less than a threshold;
setting the front lighting system at a low light illumination level; and
decreasing an illumination level to the low light illumination level.

19. The method of claim 18, further comprising:
setting the illumination level of the front lighting system to a first level for a video application interface.

20. The method of claim 18, further comprising:
setting the illumination level of the front lighting system to a second level for a text application interface.

* * * * *